United States Patent [19]

Hikawa

[11] Patent Number: 5,051,779
[45] Date of Patent: Sep. 24, 1991

[54] JOB CONTROL SHEET FOR IMAGE PROCESSING SYSTEM

[75] Inventor: Yuji Hikawa, Kanagawa, Japan
[73] Assignee: Fuji Xerox Co., Ltd., Tokyo, Japan
[21] Appl. No.: 595,856
[22] Filed: Oct. 10, 1990
[51] Int. Cl.$^5$ ............................................. G03G 15/00
[52] U.S. Cl. ..................................... 355/200; 355/313; 235/437; 235/462; 235/494
[58] Field of Search .................... 355/200, 202, 213; 358/452, 453; 235/437, 462, 494; 364/919.1

[56] References Cited

U.S. PATENT DOCUMENTS 4,736,109  4/1988  Dvorzsak ..................... 235/494 X
4,970,554  11/1990  Rourke ......................... 355/200 X Primary Examiner—Joan H. Pendegrass
Attorney, Agent, or Firm—Finnegan, Henderson, Farabow, Garrett, and Dunner

[57] ABSTRACT

An image processing system specifies input image information on the basis of existence of a special mark or patterns printed on a job control sheet. Selected one of various image processings is executed in accordance with the existence of the special mark or patterns to thereby obtain output image information. Each of the special mark or patterns are line drawings, each drawn so as to have a certain low correlative angle to longitudinal and transverse directions of an image provided with the special mark or patterns.

3 Claims, 7 Drawing Sheets

5,051,779

JOB CONTROL SHEET FOR IMAGE PROCESSING SYSTEM

BACKGROUND OF THE INVENTION

1. Field of the Invention

The present invention relates to an image processing system using a paper user interface, and particularly relates to an image processing system which is suitable for improving the recognition accuracy of special marks or patterns for detecting a job control sheet.

2. Discussion of the Related Art

An image processing system using a paper user interface is disclosed in U.S. Pat. No. 4,737,348. In this image processing system, a paper user interface acts as a user interface utilizing an image reading device such as an image scanner or the like. This is done by using a job control sheet provided with marks for informing machine operation and for indicating attributes of a job. The job control sheet further has a job control sheet detection mark printed on it so that the job control sheet can be distinguished from any other ordinary documents.

Conventionally, the job control sheet detection mark has been printed longitudinally or transversely on a job control sheet, as shown in FIG. 10. For example, when the job control sheet detection mark is a bar code in which the widths of the respective straight lines or the intervals (spaces portions) between the straight lines have information, the straight lines are printed longitudinally, transversely, or substantially longitudinally or transversely on the sheet.

As shown in FIG. 10, when bar code 60 is printed in a recording system such as a copying machine, a printer, a facsimile equipment, or the like, there is a possibility that a linear stain or noise is longitudinally or transversely generated because of a scar, or the like, on a photosensitive drum. The noise appears as straight line 61 parallel to the lines of bar code 60. In mark detection and recognition processing, after a plurality of sampling guide lines 62 are discriminated, the code information on lines 62 is sampled. The detection accuracy of code 60 is thus improved by obtaining plural pieces of sampling information as described above. If noise 61 is generated close or on the portion where mark 60 is to be printed, there is a high possibility that noise 61 will be judged to be a part of the constituent element of mark 60. A problem exists, therefore, in that the detection accuracy is reduced because an error due to noise 61 is generated every time and at substantially the same position in each code information on sampling guide lines 62.

SUMMARY OF THE INVENTION

The present invention has been made in view of the above circumstances and has as an object to provide an image processing system in which reduction of detection accuracy due to a stain or noise that has overlapped on a mark to be printed or outputted on a job control sheet is suppressed.

Additional objects and advantages of the invention will be set forth in art in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, according to an aspect of the present invention, provided is an image processing system in which input image information is specified by a special mark or pattern printed on a job control sheet so that selected one of various image processing is executed in accordance with the special mark or pattern to thereby obtain output image information, each of the special marks or patterns being line drawings drawn so as to have a certain low correlative angle to longitudinal and transverse directions of an image provided with the special mark or pattern.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings

DETAILED DESCRIPTION OF THE PREFERRED EMBODIMENTS

According to the invention, if a linear stain is longitudinally or transversely generated on the special mark or pattern, error information due to the stain is contained in plural sampled information parallel to the main scanning direction at positions different from each other in code information. The error information is removed by operational processing, and the most suitable code information is restored.

Figure 1:
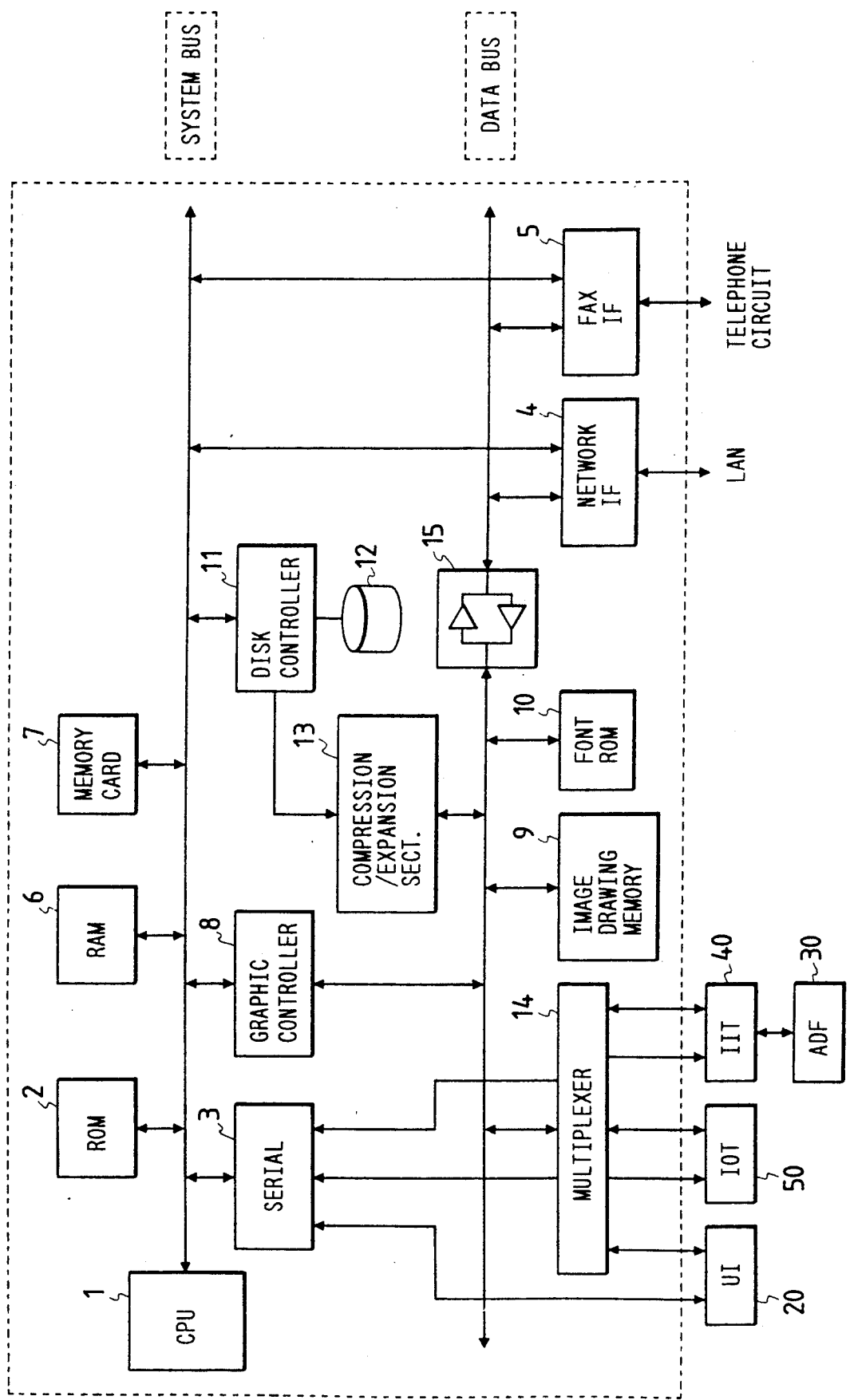
FIG. 1 is a block diagram showing the control circuit of the image processing system using a paper user interface according to the present invention.

An embodiment of the present invention will be described with reference to the accompanying drawings. FIG. 1 is a block diagram showing the control circuit of the image processing system using a paper user interface according to the present invention. CPU 1 executes a control program stored in ROM 2 so as to perform image processing on the basis of image information inputted from various input devices. CPU 1 thus forms output image information, and supplies the obtain output image information into another image processing system through image output terminal (IOT) 50 of the proper image processing system, or a network circuit, LAN, or into a facsimile equipment through a telephone circut. In this case, the input image information is at least information for indicating machine operation defined in a job control sheet and image information of a document. The output image information, on the other hand, includes not only output image information of the document, but also output image information of a changed job control sheet.

The input device includes user interface (UI) 20, such as control panel, a keyboard, a mouse, and the like, of the proper image processing system, image input terminal (IIT) 40 of the proper image processing system for reading a job control sheet and a batch of documents (a "batch") set on automatic document feeder (ADF) 30, and other image processing systems (not shown) connected to the proper image processing system through a network circuit and a telephone circuit.

The input image information of a job control sheet is input to CPU 1 through serial input/output device (I/O) 3 and interfaces (IFs) 4 and 5. Information indicating the document setting direction supplied from sheet detection marks, and job attribute information such as the size and number of sheets of paper, an address, and the like, are recognized, and the decided job attribute information is stored in back-up RAM 6 and memory card 7 together with the ID information of the proper job. At the same time, graphic controller 8 is actuated to execute a format generation task stored in ROM 2. An image is drawn on image drawing memory 9 on the basis of input image information taken into a data but through multiplexer 14 or through interfaces 4 and 5 and gate 15, and characters are read from font ROM 10 and written into image drawing memory 9, so that an image pattern of the job control sheet is generated. Graphic controller 8 executes a format generation task in the same way on both the input information of the document and the input information of the job control sheet. Thus, graphic controller 8 generates an image pattern of the document on image drawing memory 9.

The generated image patterns are stored, as image data, in a hard disk in accordance with the requirements. Under the control of disk controller 11, image data generated in the proper image processing system or image data supplied from other image processing system is compressed in compression/expansion section 13. The compressed data are stored in hard disk 13, while compressed image data stored in hard disk 12 is expanded in compression/expansion section 13 and the expanded data are supplied to the data bus.

Figure 2:
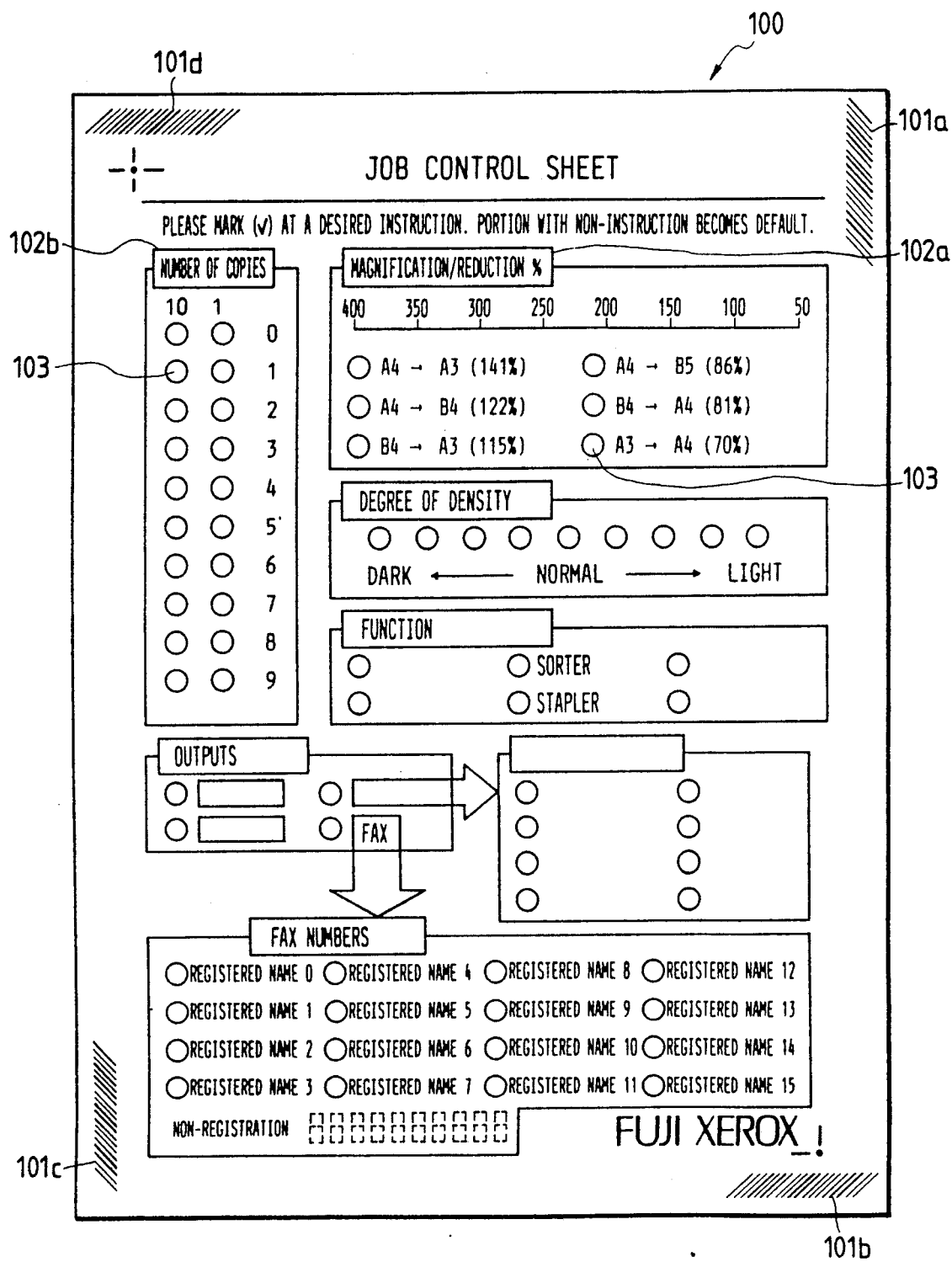
FIG. 2 is a diagram showing an example of the job control sheet.

FIG. 2 shows the format of the job control sheet. Job control sheet 100 has sheet detection marks 101a-101d indicating sheet attributes different from each other which are arranged at its four corners so as to be point symmetrical with each other. Job control sheet 100 further has job control designation sections 102a, 102b, etc. at a region inside sheet detection marks 101a-101d.

Figure 9:
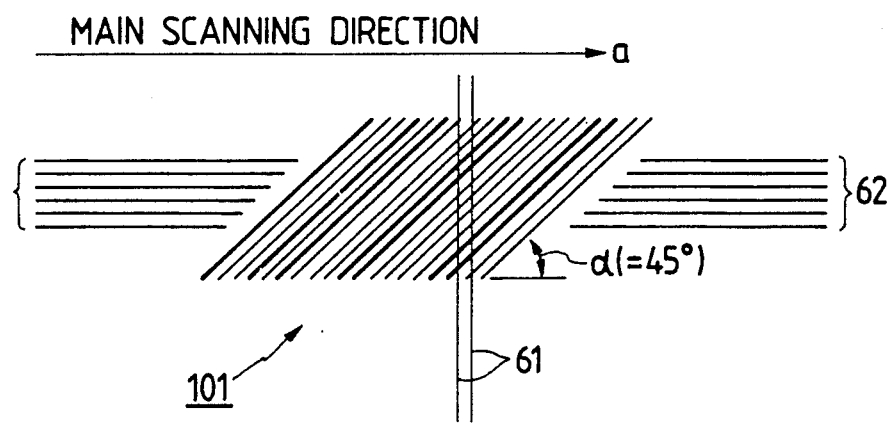
FIG. 9 is a diagram for explaining detection of bar code information.
Figure 10:
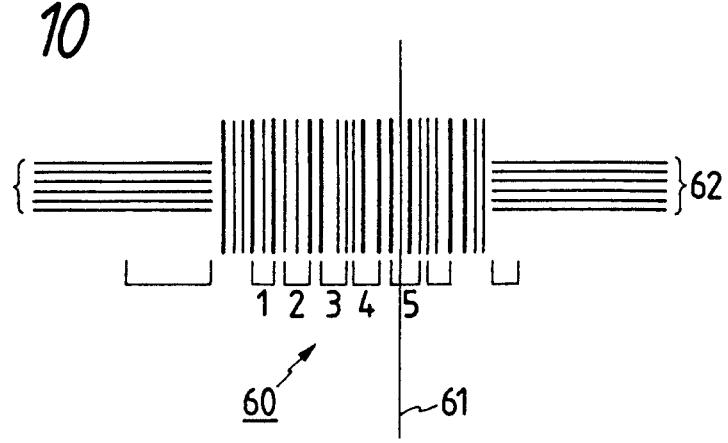
FIG. 10 is a diagram for explaining the conventional detection of bar code information.

As shown in FIG. 9, each sheet detection mark 101a-101d is printed so as to have a certain low correlative angle of α (for example, 45° C.) with respect to the main scanning direction a of a scanner.

Job control sheet 100 can be discriminated immediately after initiation of scanning because sheet detection marks 101a-101d are arranged at the four corners of job control sheet 100. Sheet 100 can be read from any direction because marks 101a-101d are arranged so as to be point symmetrical with each other. Each of marks 101a-101d includes information indicating the sheet attribute. For example, the information includes a scanning direction such as a longitudinal forward direction, a longitudinal reverse direction, a transverse forward direction, or a transverse reverse direction. For example, when the longitudinal and transverse directions are represented by "0" and "1", respectively, and the forward and reverse directions are represented by "0" and "1", respectively, the attribute of the sheet detection mark can be expressed by two bits. The longitudinal forward direction of the sheet is represented by "00" the longitudinal reverse direction is represented by "01", the transverse forward direction is represented by "10", and the transverse reverse direction is represented by "11".

Figure 4:
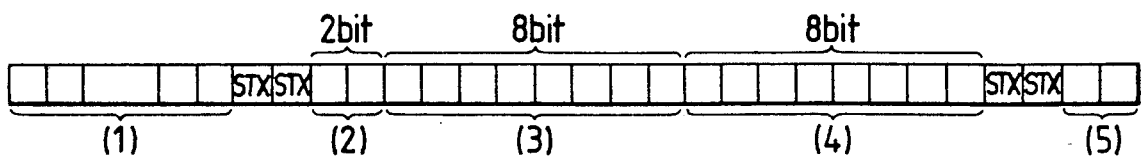
FIG. 4 is a diagram for explaining bar code information as an example of the sheet detection mark.

FIG. 4 shows an example of the attribute indicated by bar code information. The attribute indicated by code information is assigned as follows. That is, the attribute is assigned first to detection synchronizing CLK 51, sheet detection mark attribute 52 after two STX bits succeeding detection synchronizing CLK 51, paper size information 53 of job control sheet succeeding sheet detection mark 52, sheet number information 54 of the same succeeding paper size information 53, and parity 55 after two STX bits succeeding sheet number information 54. Sheet detection mark attribute 52 consists of two bits, the first bit indicates the longitudinal/transverse direction of the sheet and the second bit indicates the forward/reverse direction of the sheet.

The attributes of the job control are such that the attribute of the sheet detection mark and the paper size of the job control sheet can be discriminated in the first ten bits. Therefore, it is possible to detect the size and scanning direction of the job control sheet which has been scanned.

Furthermore, image coordinate origins 104a and 104b, which are necessary for recognizing sheet 100, are provided in job control designation sections 102. By use of origins 104a and 104b, the image processing system according to the present invention can cope even when job control sheet 100 is skewed.

Figure 5:
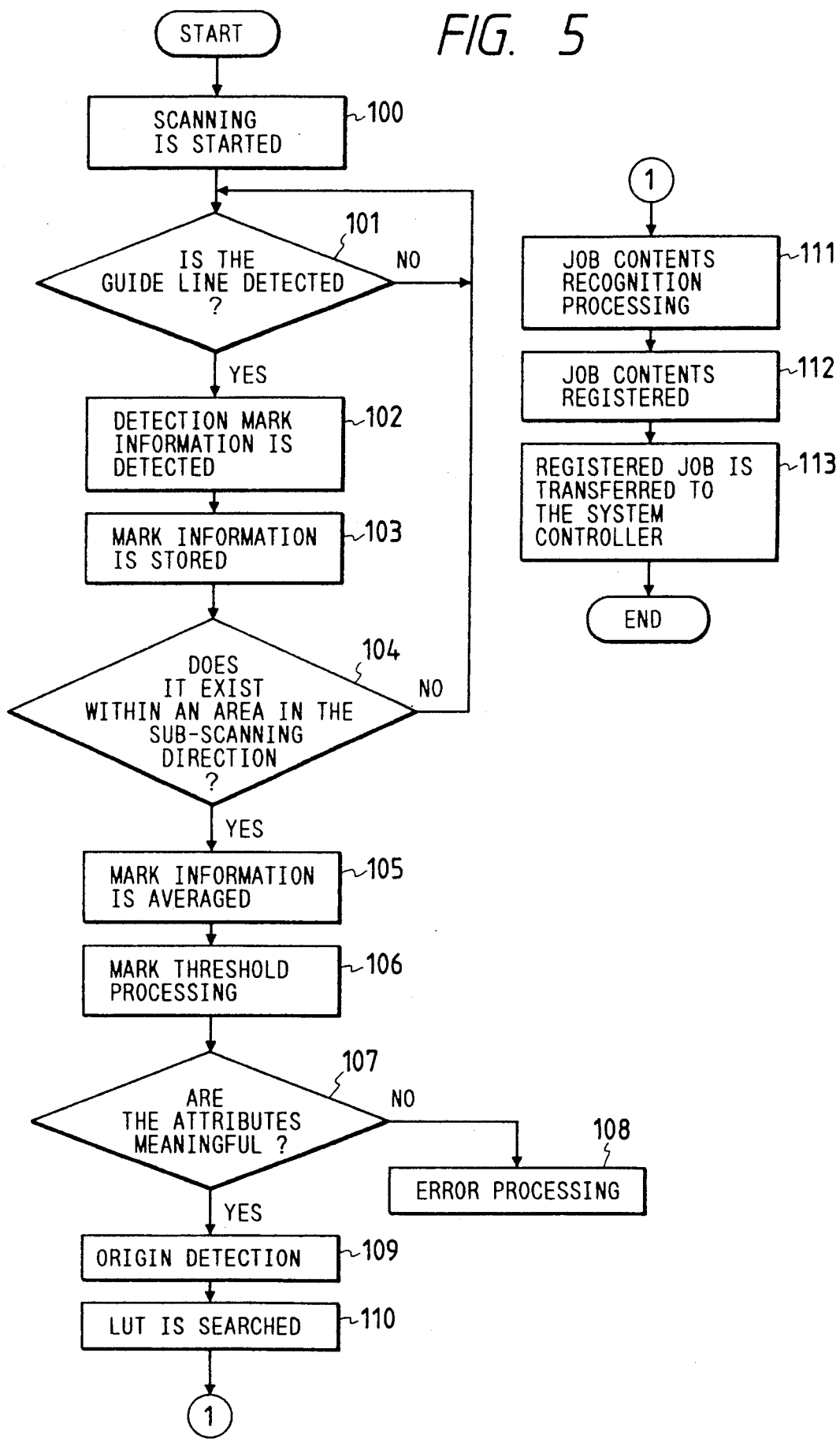
FIG. 5 is a flowchart for executing the processing for recognizing the job control sheet.

FIG. 5 is a flowchart for executing the processing of recognizing the job control sheet. When scanning is started (step 100), detection of sampling guide lines 62 of sheet detection mark 101a-101d (shown in FIG. 9) is checked (step 101). Bar code information including a parity check of FIG. 4 or sheet detection mark information, is detected along guide lines 62 (step 102), and the mark information detected for every guide line 62 is stored (step 103). Judgement is then made as to whether the detected mark information exists within an area in the sub-scanning direction of the sheet detection mark (step 104). If the answer is YES in step 104, the stored code information is averaged (step 105), and threshold processing of the averaged mark information is performed (step 106) so that encoding is completed.

Judgement is then made as to whether the detected attributes are meaningful (step 107). If the judgement proves that the attributes are meaningless and a fatal error is generated, error processing is performed (step 108). On the other hand, if the judgement proves that the attributes are meaningful, the origins are detected from the attributes (the longitudinal/transverse direction, the forward/reverse direction, and the paper size, step 109). When the detection of the origins is completed by using an origin detection routine, which will be described later, a look-up table (LUT) is searched on the basis of the sheet number (step 110). Next, job contents are searched in the LUT on the basis of the origins by using a job contents recognition processing routine, which will be described later (step 111). The decided job contents are registered (step 112) and transferred to the system controller for controlling the operation of the proper image processing system (step 113).

According to the preferred embodiment of the invention, it is possible to suppress the reduction of recognition accuracy due to a stain of the sheet detection mark. The suppression is accomplished by processing steps 105 and 106 in the sheet recognition flowchart.

Figure 6:
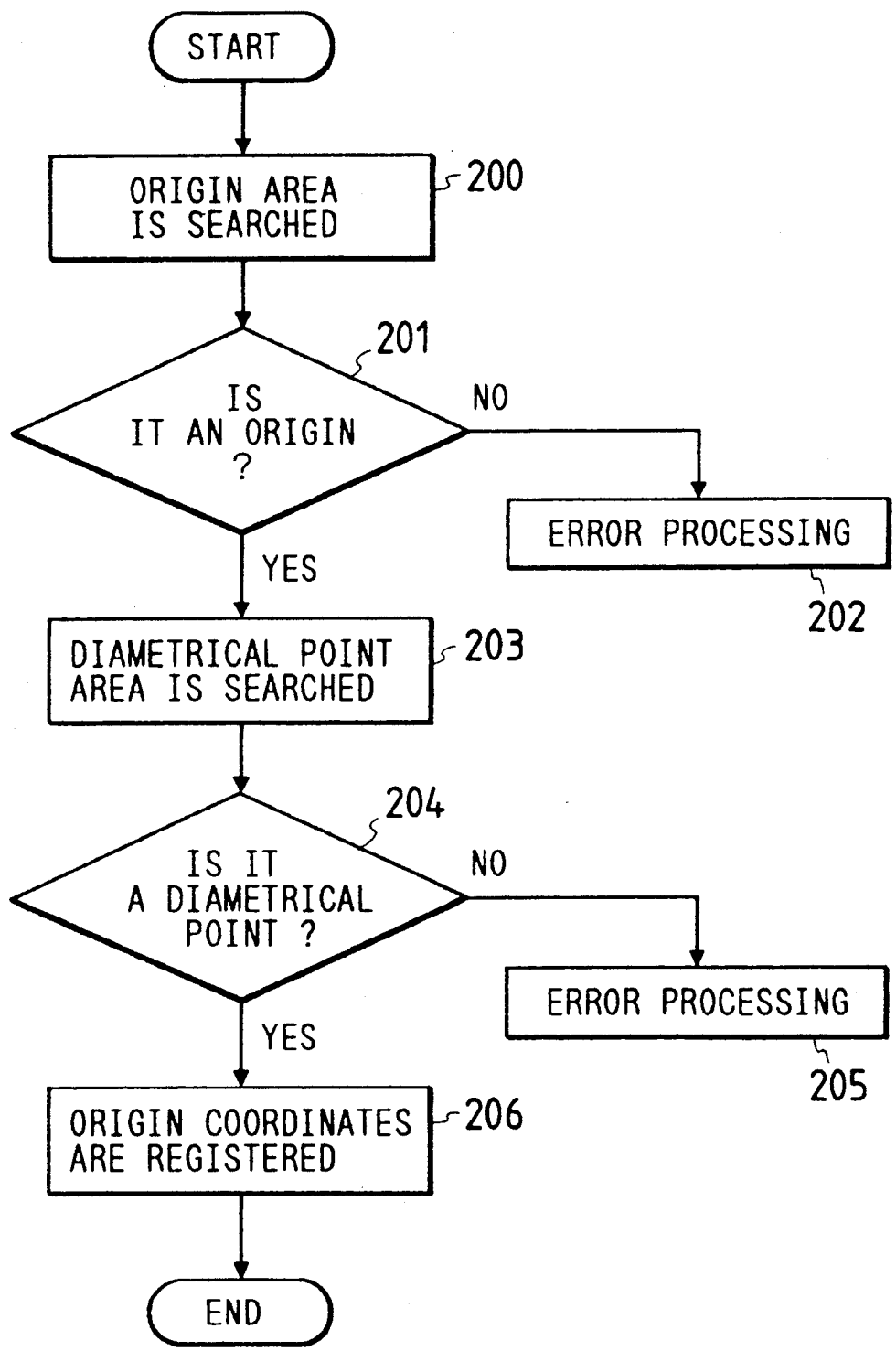
FIG. 6 is a diagram for explaining the origin detection routine.
Figure 8:
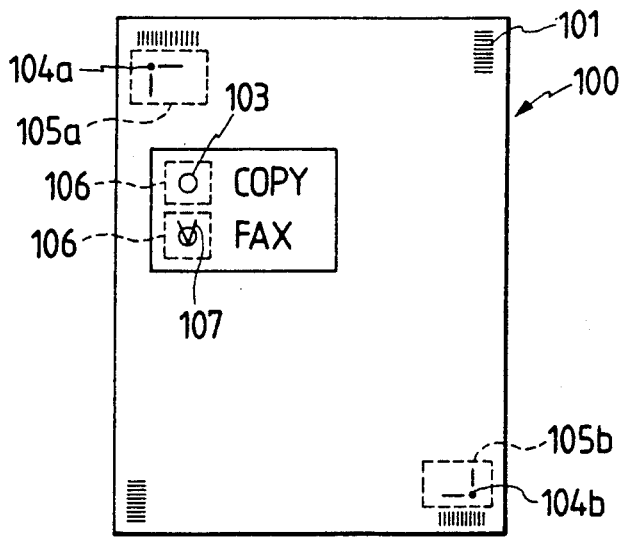
FIG. 8 is a diagram for explaining look-up areas.

FIG. 6 is a flowchart illustrating the execution of the processing for detecting the origin (diametrical point) on the basis of the attributes of the detected sheet detection mark. In the detection system, origin area 105a, or diametrical point area 105b, is set as a relatively narrow area including origin 104a or diametrical point 104b, as shown in FIG. 8. Origin 104 or diametrical point 104b is detected by searching only in the narrow area. When attributes, such as the reading direction, size, etc., of job control sheet 100 are detected from sheet detection mark 101a –101d, origin area 105a or diametrical area 105b to be searched on the basis of the attributesis set. The search in the area is then started (step 200).

In this example, origin 104a is searched on the basis of the data obtained in the set area (step 201). If origin 104a is found in the processing of step 201, the search for diametrical point area 105b is started (step 203). The search for diametrical point 105a is performed on the basis of the data obtained by the search in the same manner as in the search of origin 104a (step 204).

If diametrical point 105a is found in the processing of step 204, origin coordinates are registered (step 206). If origin 104a and diametrical point 105a are not found in search areas 105a and 105b in the processing of steps 201 and 204, respectively, error processing 202 and 205 are performed. In this case, the coordinates represent absolute coordinates of the memory.

In the origin detection system in this embodiment of the invention, the specific search area is narrower than that of the system for detecting the whole job control sheet. Thus, the detection time can be reduced.

Figure 7:
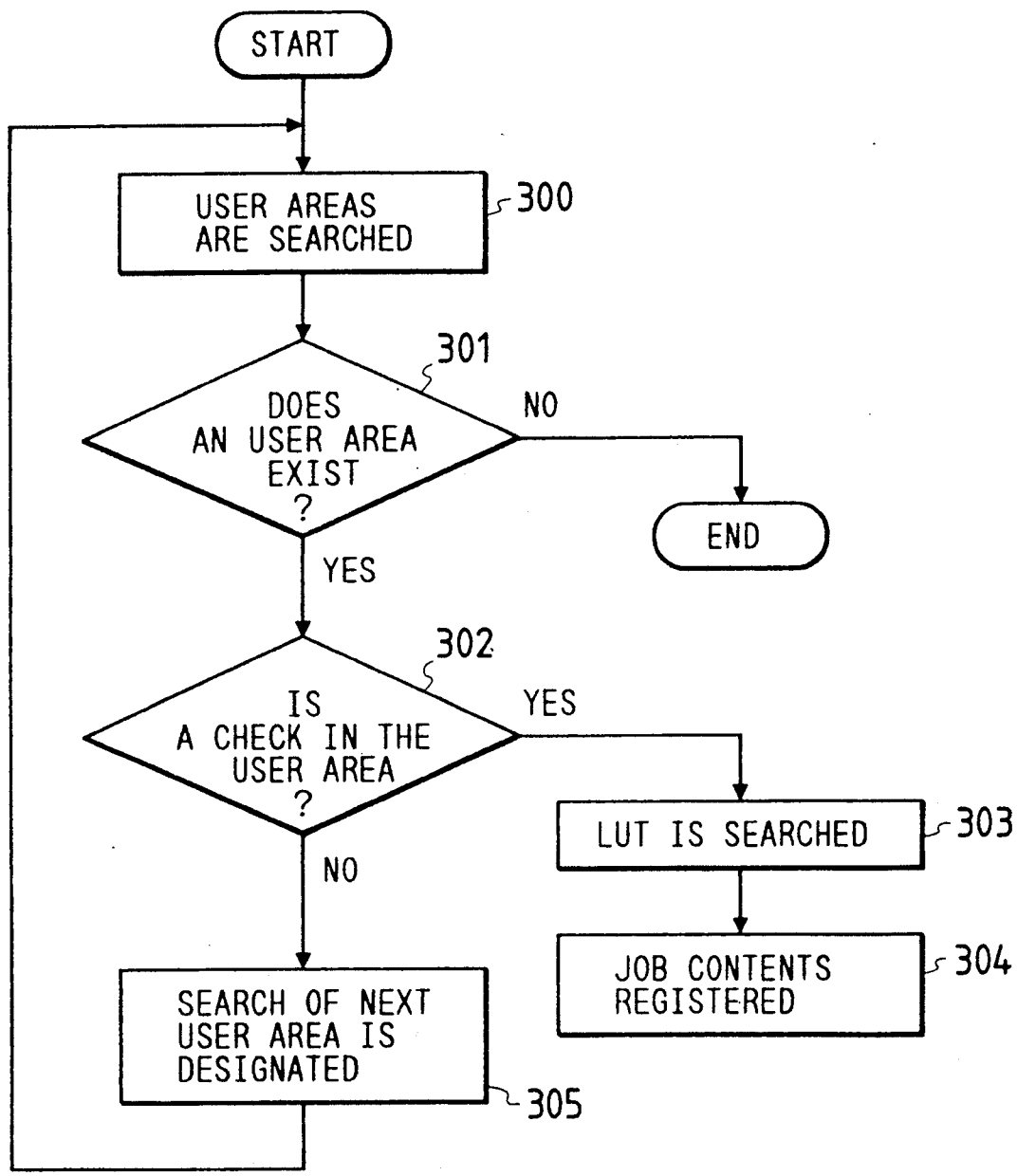
FIG. 7 is a diagram for explaining the job contents recognition routine.

FIG. 7 is a flowchart illustrating the execution of the processing for recognizing job contents. The area for user's check portion 103 is stored in the LUT as relative coordinates from origin 104a. The search for user areas 106, shown in FIG. 9, is started on the basis of the relative and origin coordinates (step 300).

Judgment is then made as to whether a user area to be searched exists (step 301). If the judgement proves that no user area to be searched exists, the processing is terminated. On the other hand, if a user area to be searched exists, judgement is made as to whether mark 107, or other marks checked by a user has been detected in the area (step 302).

For example, a checked mark exists in the user area for designating a facsimile job as machine operation indicating information as illustrated in FIG. 9. Job contents corresponding to the user area, that is, a facsimile job is searched in the LUT (step 303). Job contents of the facsimile job are registered (step 302). If the user area searched in step 302 corresponds, for example, to a copy job, it is judged no check exists. In this case, or after job contents have been registered in step 304, initiation of search of the next user area is designated (step 305).

Figure 3:
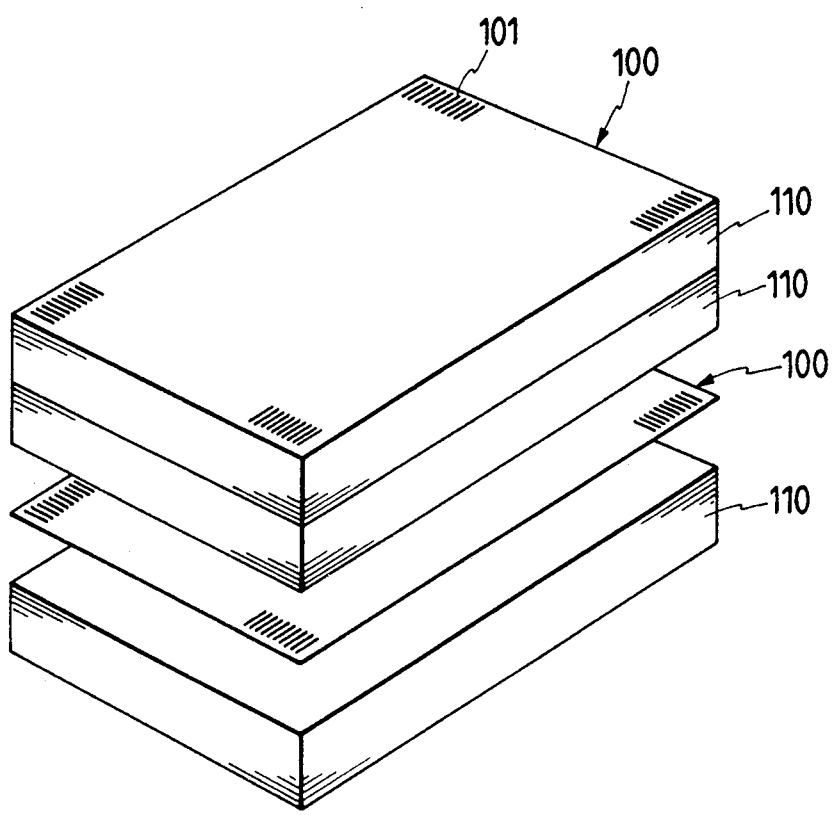
FIG. 3 is a diagram for explaining the batch processing.

The operation of the job control sheet now will be described. A user designates a desired job by checking the check portions of the job control sheet. For example, the user performs pointingout or drawing X marks, and puts in the job control sheet on a batch of documents, as shown in FIG. 3. When the batch of documents are set on the document feeder (ADF), the batches are sent to the image input terminal (IIT) successively from the job control sheet. The image input terminal (IIT) converts images of the job control sheet and the documents, successively, into electric signals or input image information. The input image information is stored in the image drawing memory through the multiplexer, and the CPU executes mark detection and recognition processing on the basis of the input image information.

In mark detection processing, when the CPU discriminates plural sampling lines 62 parallel to the main scanning direction, the CPU samples the code information on lines 62, and makes a judgement as to the kind of job control sheet it is on the basis of the plural pieces of sampling information. At this time, stain 61 overlapped on sheet detection mark 101a–101d slantingly crosses mark 101a–101d, as shown in FIG. 9. Therefor, error information due to stain 61 is contained in the code information at positions different from each other in the respective pieces of sampling information. Such error information can be removed by the operational processing to make it possible to restore the optimum code information.

If an image, which is being scanned, is judged to be that of the job control sheet, the CPU executes the processing for recognizing the job contents of the job control sheet. When an image which is a document other than a job control sheet is scanned, the CPU does not execute the job contents recognition processing.

Therefore, according to the present invention, since the detection mark of the job control sheet is printed so as to have a certain angle, reduction of the detection accuracy due to a printed stain generated longitudinally or transversely (out putting) of the job control sheet is suppressed to thereby make it possible to accurately perform a job.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing system in which input image information is specified by a special mark or pattern printed on a job control sheet so that a selected one of various image processing is executed in accordance with said special mark or pattern to thereby obtain output image information, each of said special marks or patterns being line drawings drawn so as to have a certain low correlative angle to longitudinal and transverse directions of an image provided with said special mark or pattern.

2. An image processing system for use with an image input device supplying image data representative of document data contained in documents supplied to the image input device and representative of sheet detection marks contained in the documents, the sheet detection marks including sampling guide lines, the system comprising:

receiving means for receiving the image data;

first detecting means coupled to the receiving means for detecting image data representative of the sampling guide lines;

second detecting means coupled to the receiving means for detecting image data, representative of mark information lines of the sheet detection marks, intersecting the sampling guide lines at a predetermined low correlative angle;

first processing means coupled to the second detecting means for processing the detected image data representative of mark information lines to obtain job control information; and second processing means coupled to the first processing means for processing image data representative of document information is accordance with the job control information to provide an output image.

3. A system as recited in claim 2 wherein the predetermined low correlative angle is about 45 degrees.

* * * * *

UNITED STATES PATENT AND TRADEMARK OFFICE
CERTIFICATE OF CORRECTION

PATENT NO. : 5,051,779
DATED     : September 24, 1991
INVENTOR(S) : Yuji Hikawa

It is certified that error appears in the above-identified patent and that said Letters Patent is hereby corrected as shown below:

Claim 2, column 8, line 5, change "is" to --in--.

Signed and Sealed this

Twenty-third Day of March, 1993

Attest:

STEPHEN G. KUNIN

Attesting Officer

Acting Commissioner of Patents and Trademarks

UNITED STATES PATENT AND TRADEMARK OFFICE
CERTIFICATE OF CORRECTION

PATENT NO. : 5,051,779
DATED : September 24, 1991
INVENTOR(S) : Yuji Hikawa

It is certified that error appears in the above-identified patent and that said Letters Patent is hereby corrected as shown below:

Column 1, line 14, change "4,737,348" to --4,757,348--.

Signed and Sealed this

Twenty-fifth Day of May, 1993

Attest:

MICHAEL K. KIRK

Attesting Officer

Acting Commissioner of Patents and Trademarks